(12) United States Patent
DeBerry et al.

(10) Patent No.: US 8,635,745 B2
(45) Date of Patent: Jan. 28, 2014

(54) METAL LOCKING TIE

(75) Inventors: Earl J. DeBerry, Joliet, IL (US); Scott K. Benedict, New Lenox, IL (US); Christopher W. Hipple, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 588 days.

(21) Appl. No.: 12/952,409

(22) Filed: Nov. 23, 2010

(65) Prior Publication Data

US 2012/0124783 A1    May 24, 2012

(51) Int. Cl.
*B65D 63/08*    (2006.01)

(52) U.S. Cl.
USPC ............................................................. 24/25

(58) Field of Classification Search
USPC .............................................................. 24/25
See application file for complete search history.

(56) References Cited

U.S. PATENT DOCUMENTS

| | | |
|---|---|---|
| 196,432 A | 10/1877 | Chapman |
| 2,870,503 A | 1/1959 | McAneny |
| 3,257,694 A | 6/1966 | Litwin |
| 3,528,142 A | 9/1970 | Lodholm |
| 3,754,303 A | 8/1973 | Pollock |
| 3,833,969 A | 9/1974 | Hollingsworth et al. |
| 4,473,925 A | 10/1984 | Jansen |
| 4,587,692 A | 5/1986 | Kaderabek |
| 4,868,953 A * | 9/1989 | Fortsch .......................... 24/23 R |
| 4,887,334 A | 12/1989 | Jansen et al. |
| 6,647,596 B1 * | 11/2003 | Caveney ........................... 24/21 |
| 6,668,427 B2 | 12/2003 | Bulanda et al. |
| 7,603,751 B2 | 10/2009 | Caveney et al. |
| 7,669,293 B2 * | 3/2010 | Huang ............................... 24/25 |
| 2004/0016085 A1 | 1/2004 | Caveney |
| 2008/0005872 A1 * | 1/2008 | Huang ........................... 24/20 R |

FOREIGN PATENT DOCUMENTS

| | | | | |
|---|---|---|---|---|
| EP | 952091 A1 * | 10/1999 | ............ | B65D 63/08 |
| EP | 1283176 A2 * | 2/2003 | ............ | B65D 63/08 |
| EP | 1359356 A1 | 11/2003 | | |
| FR | 1267912 A | 7/1961 | | |

* cited by examiner

*Primary Examiner* — Robert J Sandy
(74) *Attorney, Agent, or Firm* — Christopher S. Clancy; Aimee E. McVady

(57) ABSTRACT

The metal locking tie includes a tie body and a bi-level head. The tie body includes a first end and a second end. The first end of the tie body is secured to the bi-level head. The bi-level head includes a roof, a bottom wall, a primary head floor and a secondary head floor. The bi-level head also includes a locking ball positioned within the head. The primary head floor includes a locking displacement hole for receiving the locking ball. When the second end of the tie body is tensioned, the locking ball moves toward the locking displacement hole to secure the tie body in the bi-level head.

7 Claims, 15 Drawing Sheets

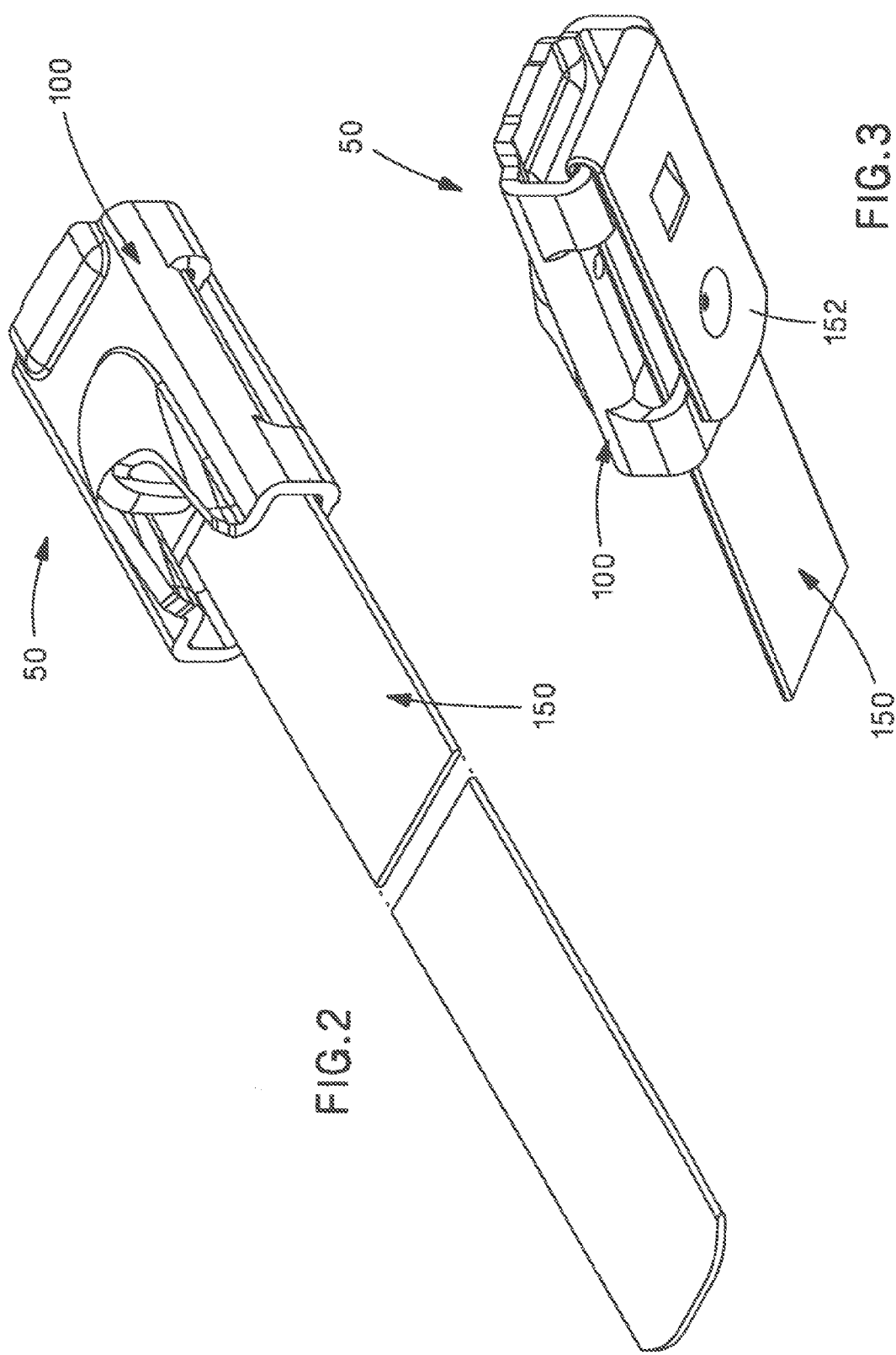

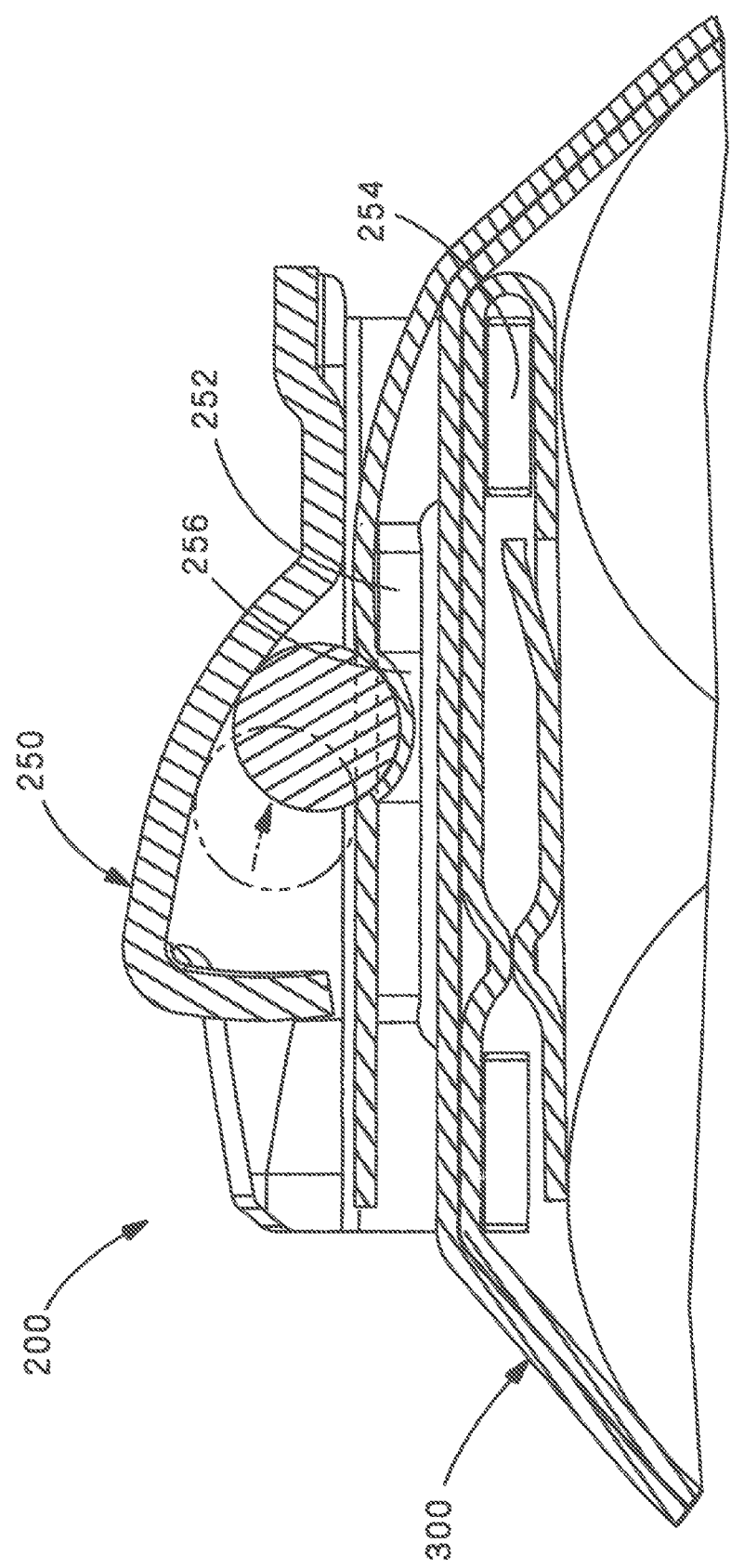

METAL LOCKING TIE

FIELD OF THE INVENTION

The present invention relates to a metal locking tie, and more particularly to a metal locking tie with a bi-level head.

BACKGROUND OF THE INVENTION

Metallic bundling devices incorporating locking balls and roller pins have been used for bundling bales of cotton or the like since the Nineteenth Century. None of the prior art devices were positive locking, i.e. depending on the orientation of the locking head, gravity could hold the ball out of locking engagement with the strap resulting in release. U.S. Pat. No. 4,399,592 addressed this problem by teaching the addition of a raised portion or protuberance for deflecting the threaded strap away from the floor as the threaded strap exits the locking head. This deflection ensures that the locking ball is in continuous engagement with the threaded strap regardless of the position of the ball or the orientation of the locking head.

It would be desirable to provide an improved metal locking tie that reduces the linear displacement of the tie body under a load.

It would also be desirable to provide a metal locking tie having improved loop tensile performance.

SUMMARY OF THE INVENTION

A metal locking tie having a tie body and a bi-level head is disclosed. The tie body includes a first end and a second end. The bi-level head is secured to the first end of the tie body. The bi-level head includes a roof, a bottom wall, a primary head floor and a secondary head floor. The bi-level head also includes a locking ball for securing the tie body once it is tensioned. The primary head floor includes a locking displacement hole for receiving the locking ball. The second end of the tie body is looped around a bundle one or more times and through the bi-level head so that the tie body extends between the secondary head floor and the primary head floor. The final loop is threaded through the bi-level head, between the locking ball and the primary head floor. As the second end of the tie body is tensioned, the locking ball moves towards the locking displacement hole to secure the tie body in the head.

BRIEF DESCRIPTION OF THE DRAWINGS

FIG. 2 is a top perspective view of the metal locking tie of FIG. 1.

FIG. 3 is a bottom perspective view of the metal locking tie of FIG. 1.

FIG. 21 is a sectional view of the metal locking tie of FIG. 19 with the locking ball positioned in the locking displacement hole and the tie body cut off.

DETAILED DESCRIPTION

Figure 1:
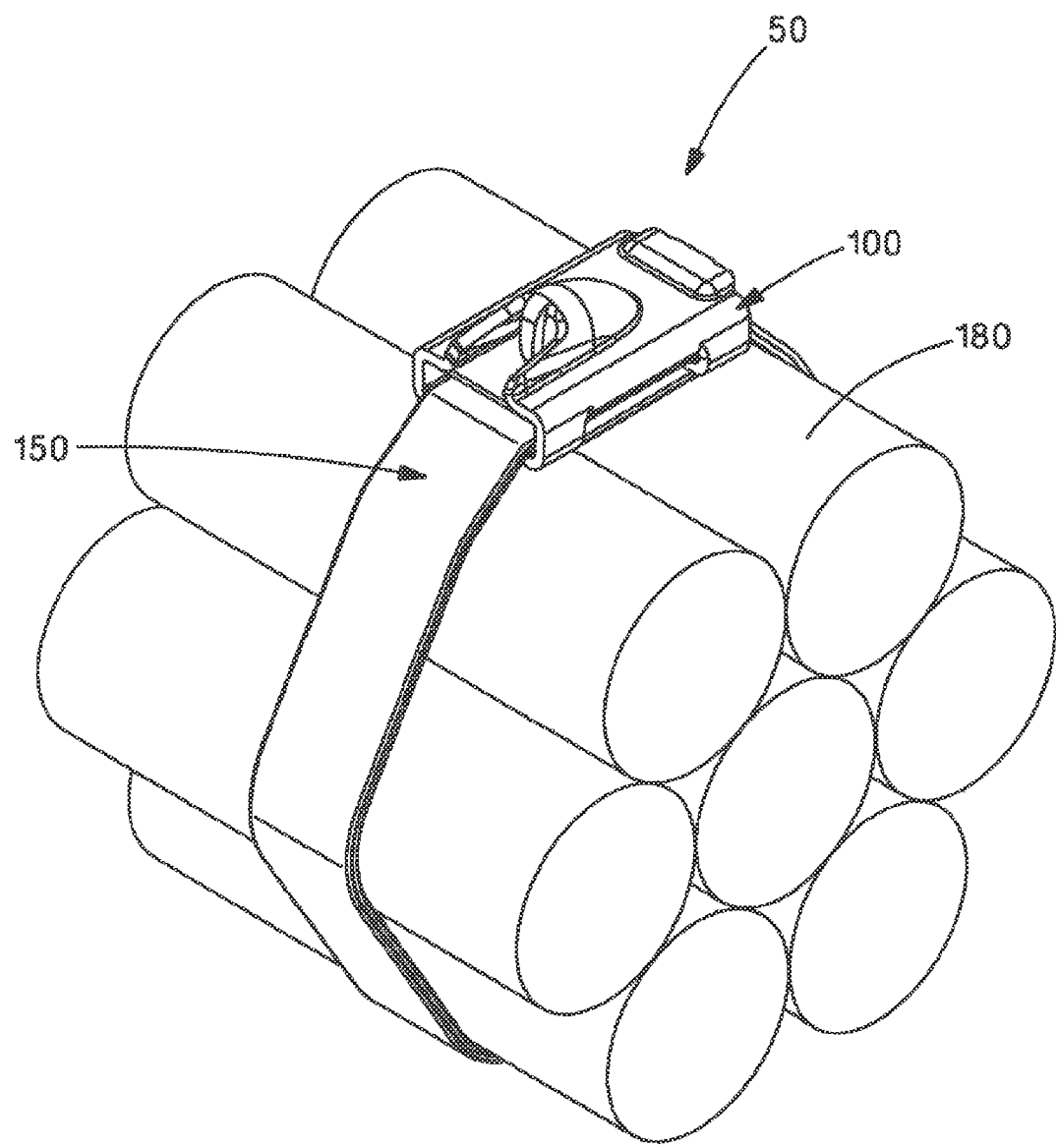
FIG. 1 is a perspective view of the metal locking tie of the present invention installed around a bundle of cables.

FIG. 1 illustrates the metal locking tie 50 of the present invention installed around a bundle of cables 180. The metal locking tie 50 of the present invention includes a bi-level head 100 and a tie body 150, FIGS. 2 and 3 illustrate the metal locking tie 50 with a first end 152 of the tie body 150 installed in the bi-level head 100.

Figure 4:
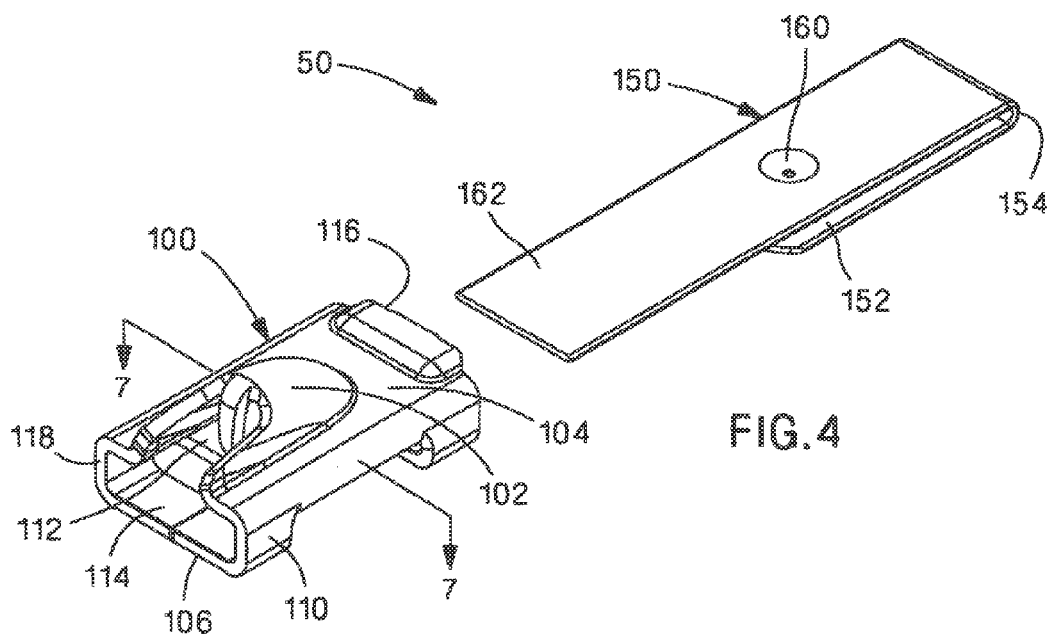
FIG. 4 is an exploded top perspective view of the metal locking tie of FIG. 1 with the tie body separate from, the bi-level head.
Figure 5:
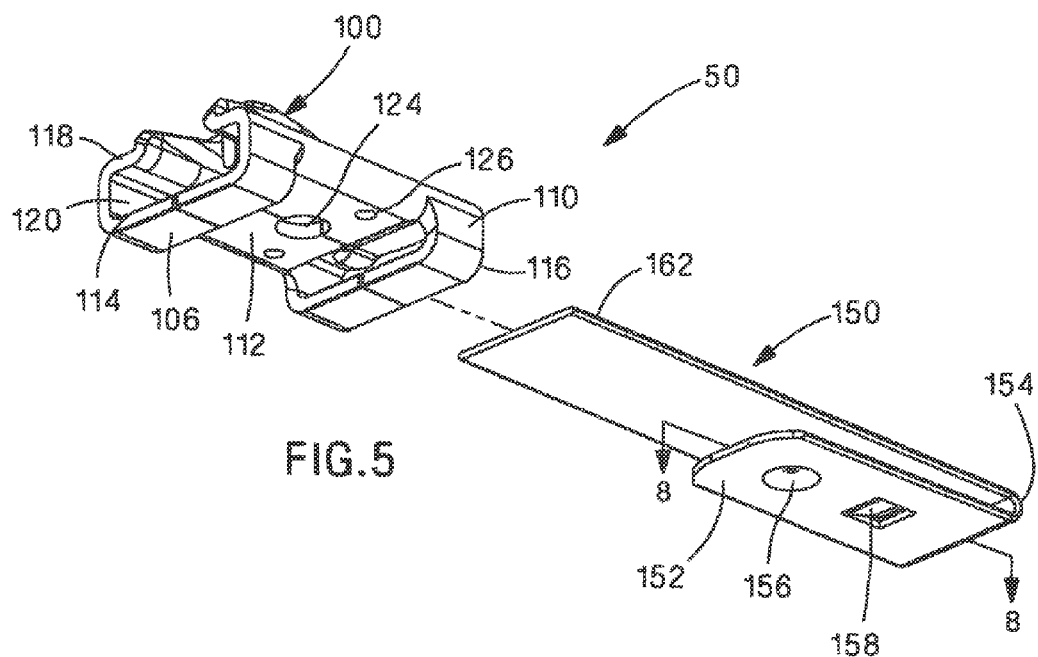
FIG. 5 is an exploded bottom perspective view of the metal locking tie of FIG. 4 with the tie body separate from the bi-level head.
Figure 6:
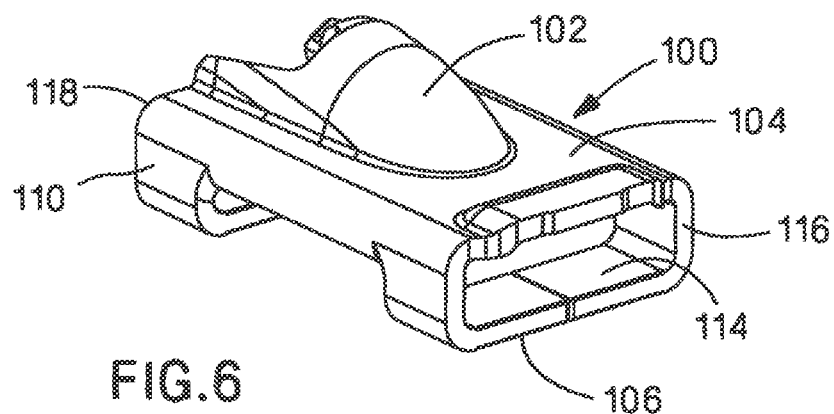
FIG. 6 is a top perspective view of the bi-level head of the metal locking tie of FIG. 1.
Figure 8:
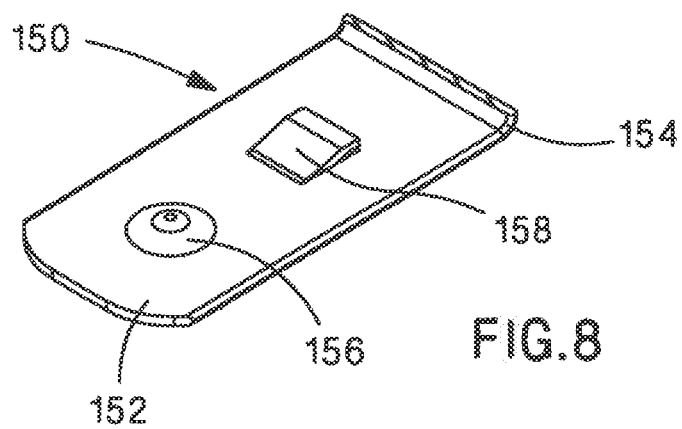
FIG. 8 is a cross-sectional view of the first end of the tie body taken along line 8-8 of FIG. 5.

FIGS. 4, 5 and 8 illustrate the tie body 150 before it is installed in the bi-level head 100. The tie body 150 includes a first end 152 with a folded portion 154 and a second end 162. The folded portion 154 fits around an entrance end 116 of the bi-level head 100. The first end 152 of the tie body 150 includes an upwardly extending deformation 156 and an upwardly extending locking tab 158. The tie body 150 also includes a second downwardly extending deformation 160 that is designed to engage the first deformation 156 when the tie body 150 is positioned in the bi-level head 100 (see FIGS. 9-11).

FIGS. 4-7 illustrate the bi-level head 100. The bi-level head 100 includes a roof 102, a ceiling 104 and a bottom wall 106. The ceiling 104 and the bottom wall 106 are joined by sidewalls 110. The bi-level head 100 includes a primary head floor 112 and a secondary dual head floor 114 with an entrance end 116 and an exit end 118. As illustrated in FIGS. 9-11, 13 and 15, a first passageway 120 (see FIG. 5) is located between the secondary dual head floor 114 and the primary head floor 112 and a second passageway 122 is located between the primary head floor 112 and a locking ball 128.

Figure 7:
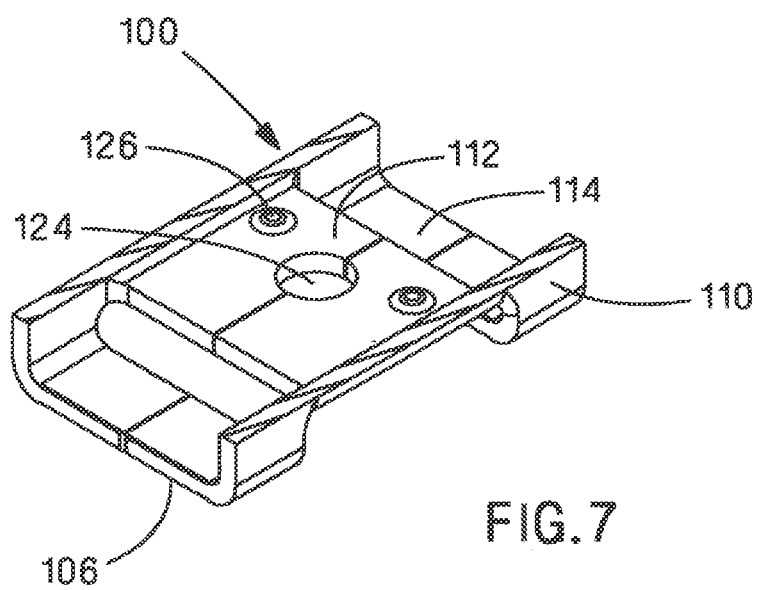
FIG. 7 is a cross-sectional view of the bi-level head of FIG. 4 taken along line 7-7.

As illustrated in FIG. 7, the primary head floor 112 includes a locking displacement hole 124 located at the center of the primary head floor 112. The locking displacement hole 124 is created in the bi-level head 100 instead of the lie body 150, which limits the likelihood of misaligning the locking ball in the head by reducing the number of components required to secure the metal locking tie. As a result, the design of the bi-level head 100 with the locking displacement hole 124 creates a repeatable and consistent relationship between the locking displacement hole 124 and the locking ball 128.

The primary head floor 112 also includes raised dimples 126 positioned on each side of the locking displacement hole 124 adjacent to the sidewalls 110 of the bi-level head 100.

Figure 9:
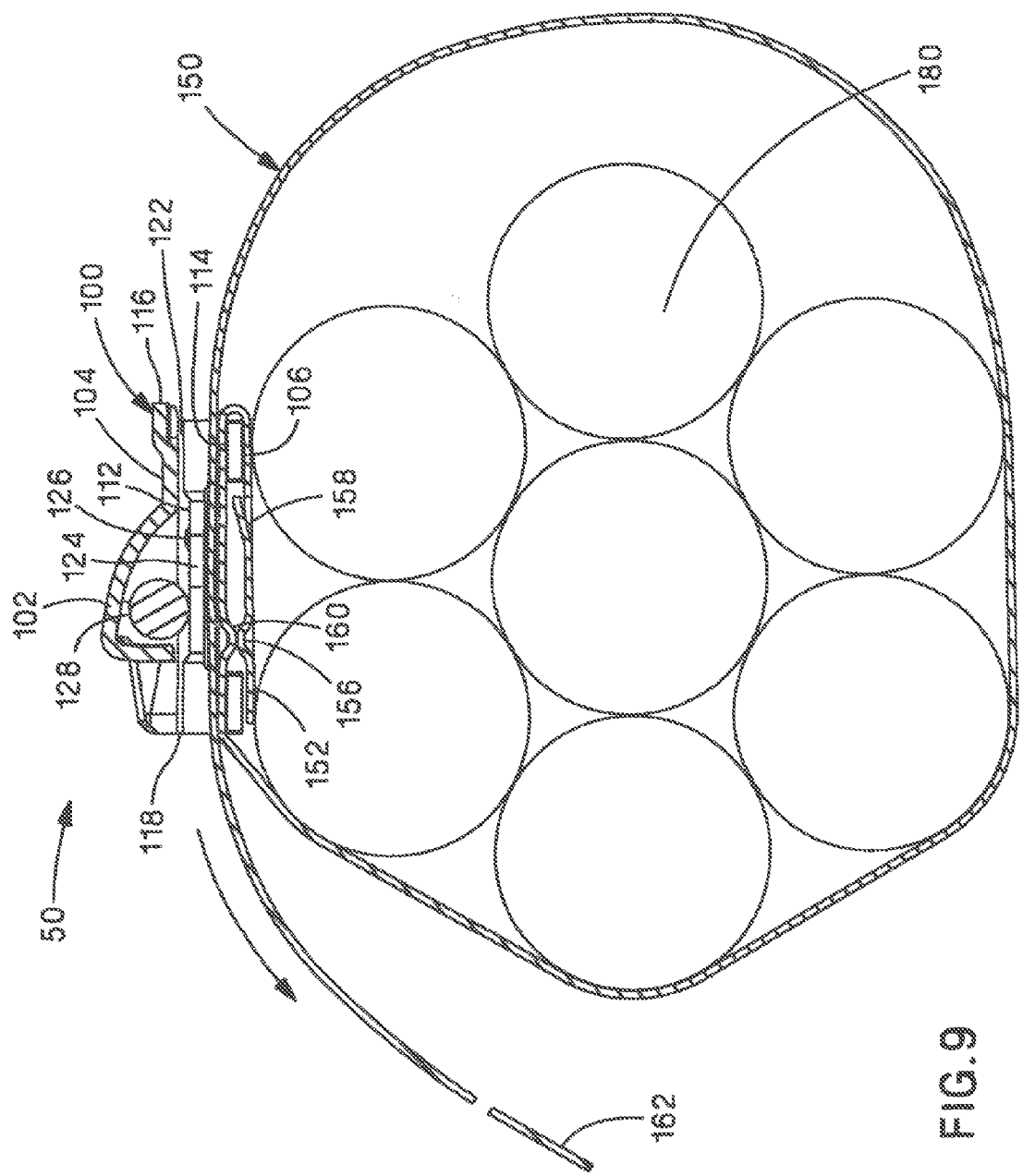
FIG. 9 is a sectional view of the metal locking tie of FIG. 1 being installed around a bundle of cables with the tie body extending along the secondary dual head floor.

FIGS. 9-15 illustrate the metal locking tie 50 of the present invention being installed around a bundle of cables 180. As illustrated in FIG. 9, the first end 152 of the tie body 150 is positioned along the bottom wall 106 of the bi-level head 100 and the folded portion 154 is positioned at the entrance end 116 of the first passageway 120. The tie body 150 extends through the bi-level head 100 along the secondary dual head floor 114. The upwardly extending locking tab 158 engages the bottom wall 106 to secure the tie body 150 to the bi-level head 100, with the first and second deformations 156, 160, respectively, of the tie body 150 contacting each other.

To install the metal locking tie 50 around a bundle of cables 180, the tie body 150 forms a first loop around the bundle of cables 180. Next, the tie body 150 enters the first passageway 120 at the entrance end 116 of the bi-level head 100. The tie body 150 extends through the first passageway 120 such that the tie body 150 is positioned between the first end 152 of the tie body 150 installed in the bi-level head 1.00 and the bottom of the primary head floor 112. The tie body 150 wraps around the bundle of cables 180 again to complete a second loop. If desired, the bi-level head 100 may be designed with a greater clearance between the secondary dual head floor 114 and the primary head floor 112 to allow for an additional loop of the tie body 150 through the first passageway 120.

Figure 10:
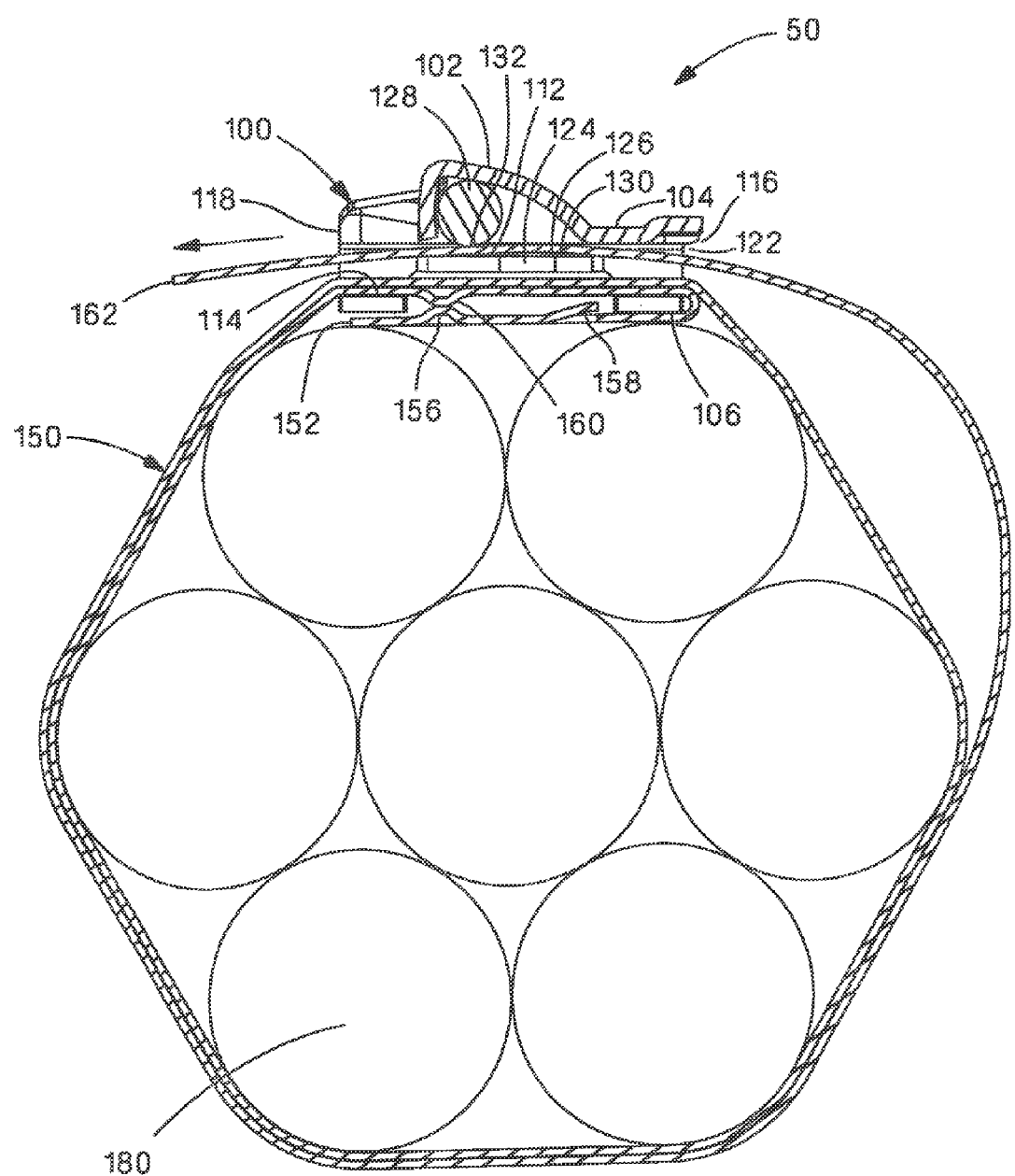
FIG. 10 is a sectional view of the metal locking tie of FIG. 1 being installed around a bundle of cables with the tie body extending along the primary head floor.
Figure 11:
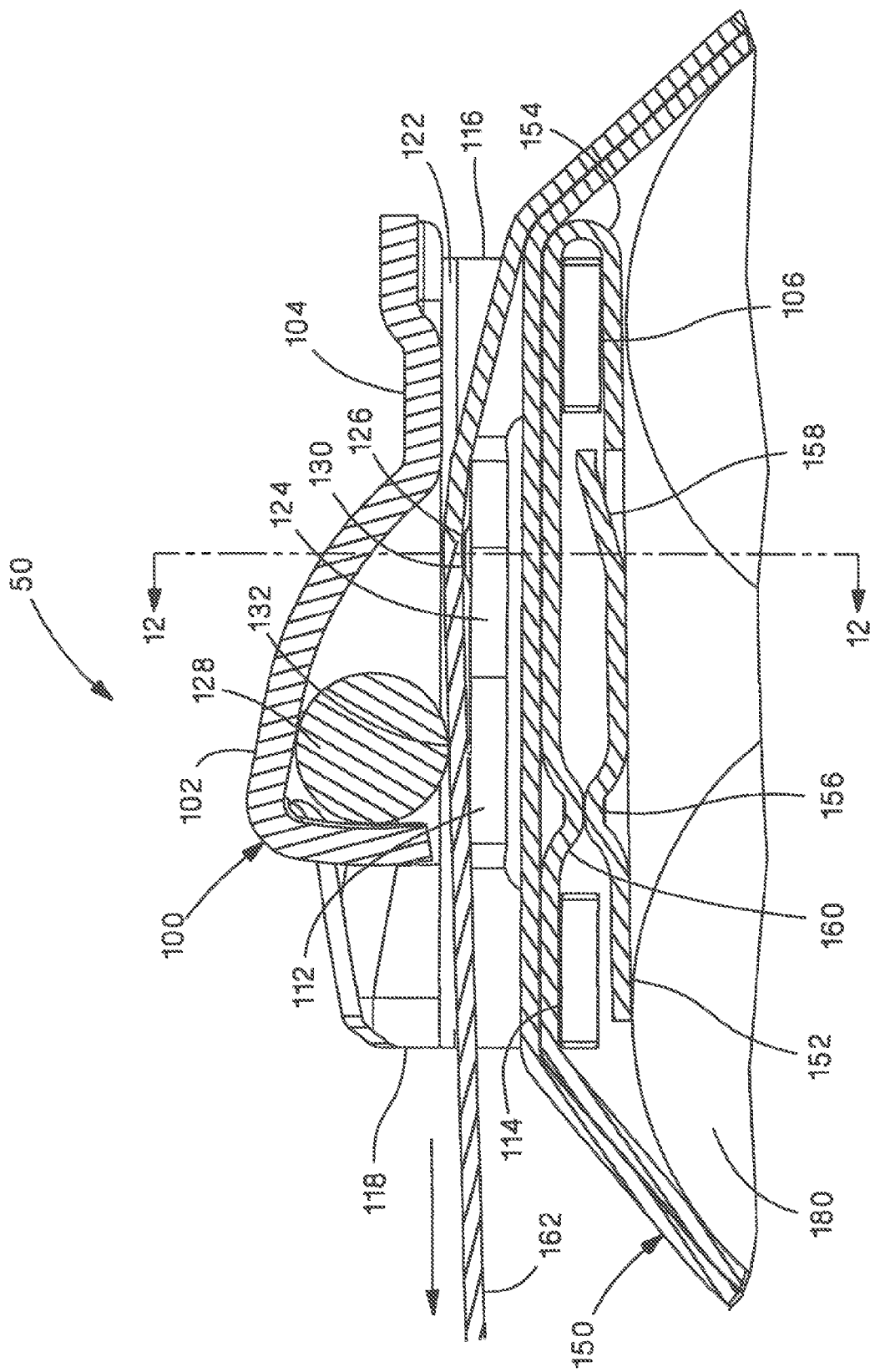
FIG. 11 is a partial sectional view of the metal locking tie of FIG. 10.
Figure 12:
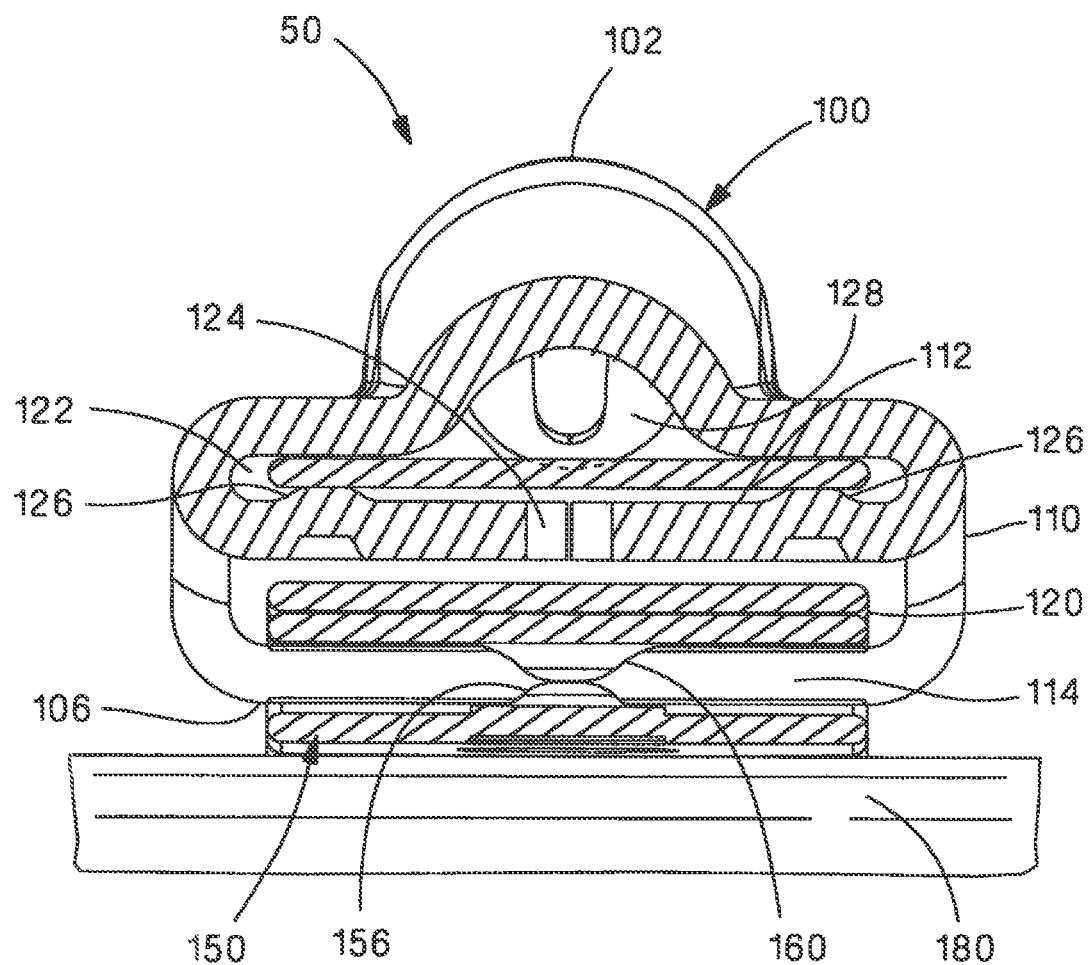
FIG. 12 is a cross-sectional view of the metal locking tie of FIG. 11 taken along line 12-12.

As illustrated in FIG. 10, once the tie body 150 completes the second loop around the bundle of cables 180, the tie body 150 enters the second passageway 122 at the entrance end 11.6 of the bi-level head 100. The tie body 150 extends through the second passageway 122 so that it is positioned between the primary head floor 112 and the locking hall 128. As the tie body 150 extends through the second passageway 122, the raised dimples 126 create primary contact points 130 on the tie body 150 and the locking ball 128 creates a secondary contact point 132 on the tie body 150.

FIGS. 11-14 illustrate the tie body 150 installed in the bi-level head 100 with the tie body 150 being tensioned around the bundle of cables 180. As the tension on the tie body 150 increases, the tie body 150 begins to move the locking ball 128 toward the locking displacement hole 124 in the bi-level head 100 (see FIG. 13). As the locking hall 128 approaches the locking displacement hole 124, the raised dimples 126 promote a bi-planar curvature in the tie body 150 (see FIG. 14).

The tensioned tie body 150 draws the locking ball 128 towards the entrance end 116 and the raised dimples 126 to create a larger contact surface area between the locking ball 128 and the tie body 150. As a result, the friction between the locking hail 128 and the tie body 150 is increased.

Figure 14:
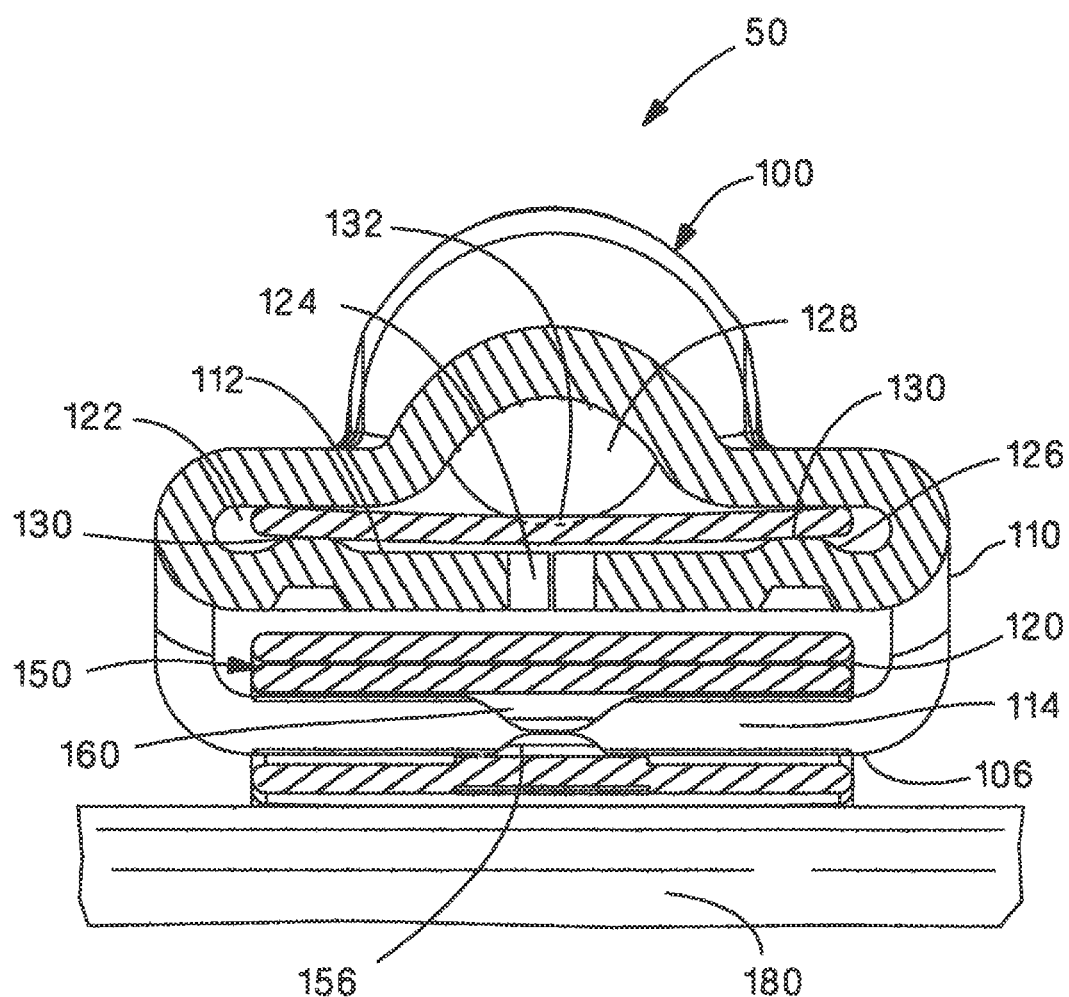
FIG. 14 is a cross-sectional view of the metal locking tie of FIG. 13 taken along line 14-14.

FIG. 14 illustrates the raised dimples 126 creating the two primary contact points 130 on the outer edges of the tie body 150. The locking ball 128 produces a downward force on the center of the tie body 150 creating the secondary contact point 132. The tie body 150 forms a concave surface, or a bi-planar curvature, thereby increasing the contact surface area between the locking ball 128 and the tie body 150. As a result, a shorter, more effective locking action is created and the linear displacement of the tie body 150 is reduced.

Figure 15:
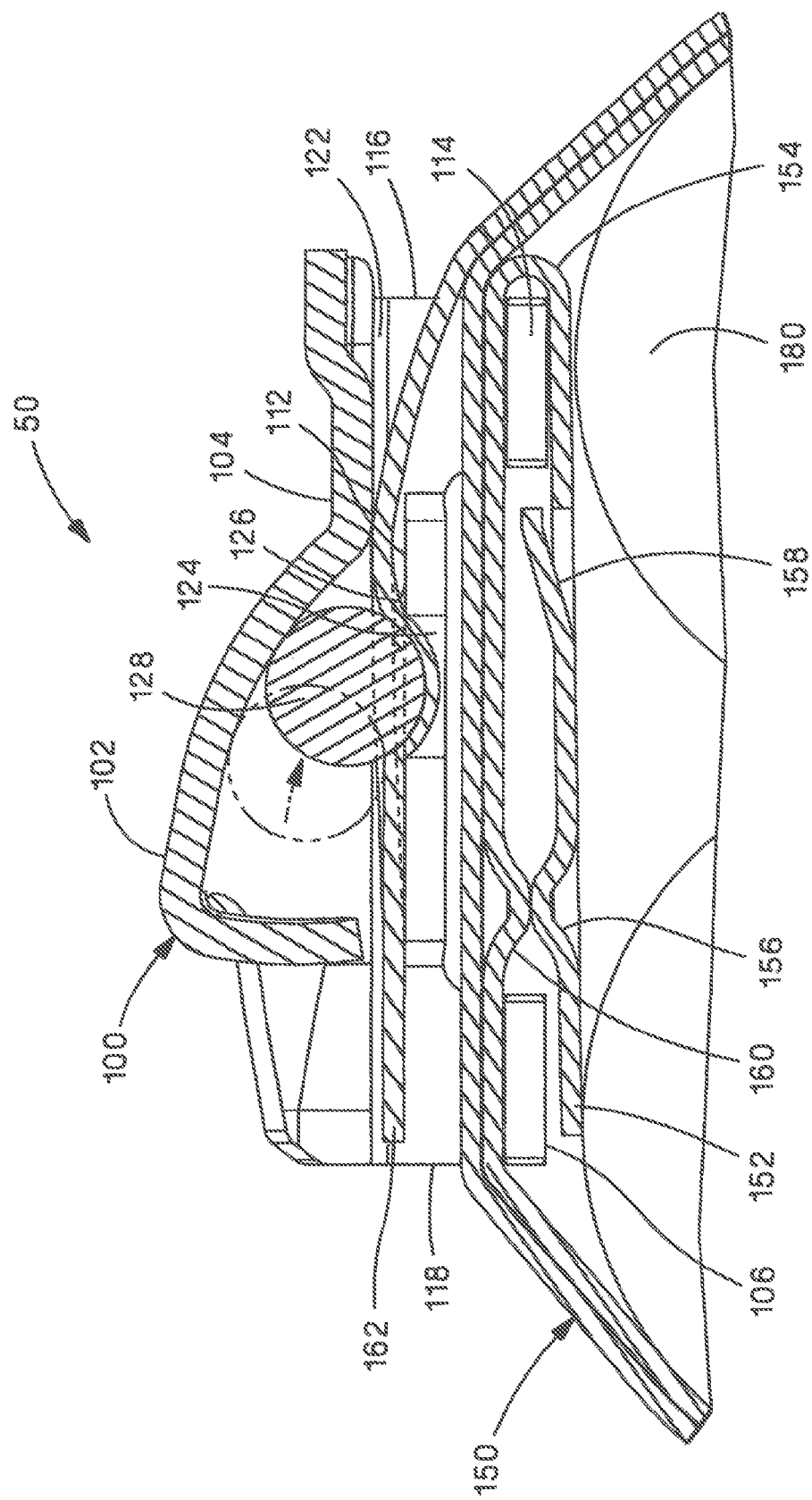
FIG. 15 is a partial sectional view of the metal locking tie of FIG. 10 with the locking Fall positioned in the locking displacement hole and the tie body cut off.
Figure 16:
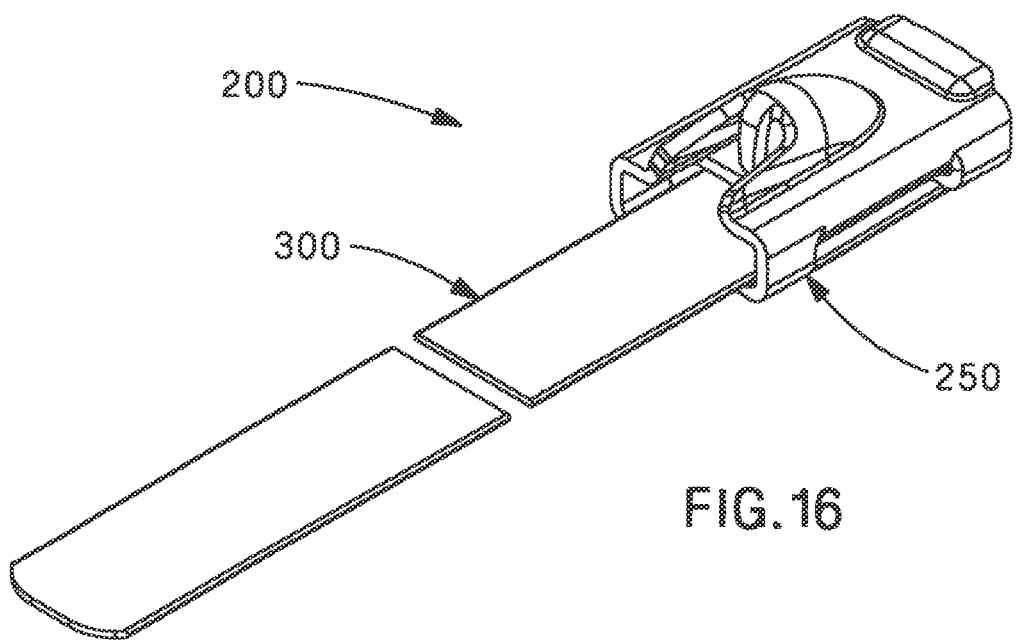
FIG. 16 is a perspective view of an alternative metal locking tie of the present invention.

FIG. 15 illustrates the tie body 150 installed in the bi-level head 100 after a predetermined tension has been reached and the tie body 150 has been cut off by a tool (not illustrated). The locking ball 128 and a portion of the tie body 150 are positioned in the locking displacement hole 124 to secure the tie body 150 in the bi-level head 100.

The bi-level head 100 of the metal locking tie 50 separates the loops of the tie body 150. As a result, the three required to insert the tie body 150 through the bi-level head 100 is minimized for each loop of the tie body 150.

Figure 13:
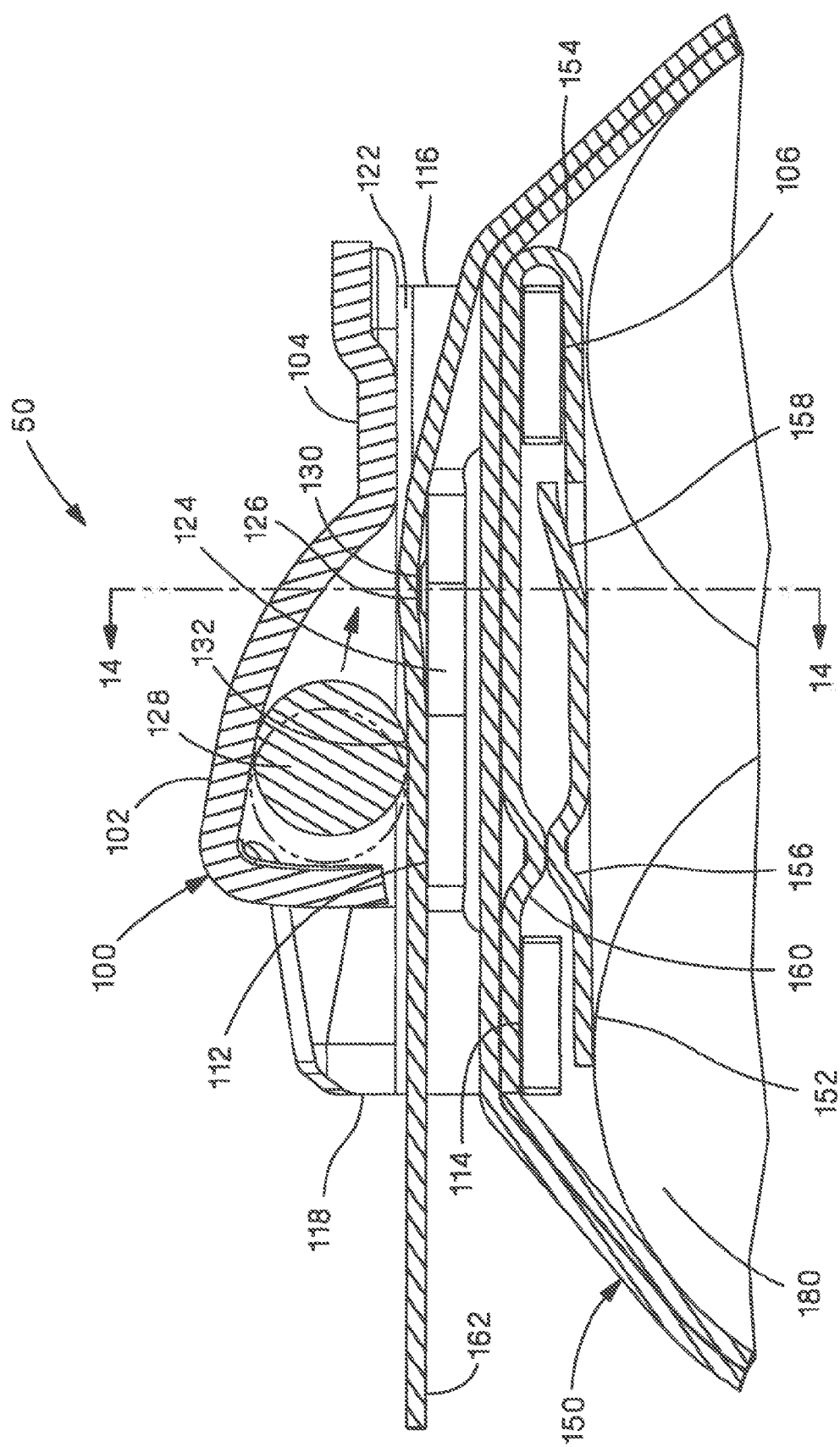
FIG. 13 is a partial sectional view of the metal locking tie of FIG. 10 with the locking ball approaching the locking displacement hole and the tie body extending along the primary head floor.

Another benefit of the bi-level head 100 is that the contact points 130, 132 on the tie body 150 create an increased spring condition that improves the continuous contact between the locking ball 128 and the tie body 150 (see FIGS. 13-14).

The bi-level head 100 also reduces the linear displacement of the tie body 150, provides a stronger metal locking tie 50 and reduces the variability in performance of the metal locking tie 50.

Figure 17:
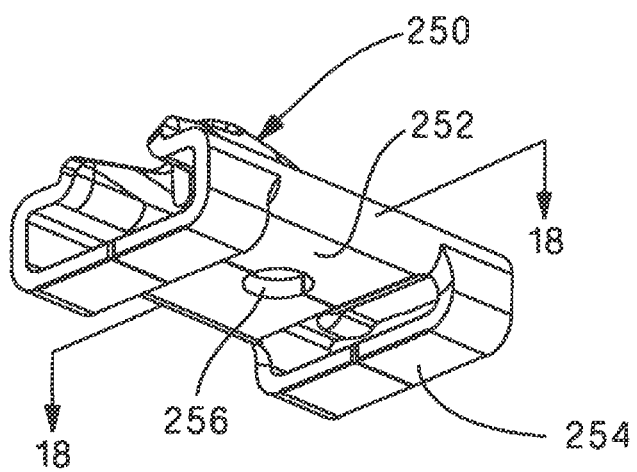
FIG. 17 is a bottom perspective view of the bi-level head of the alternative metal locking tie of FIG. 16.
Figure 18:
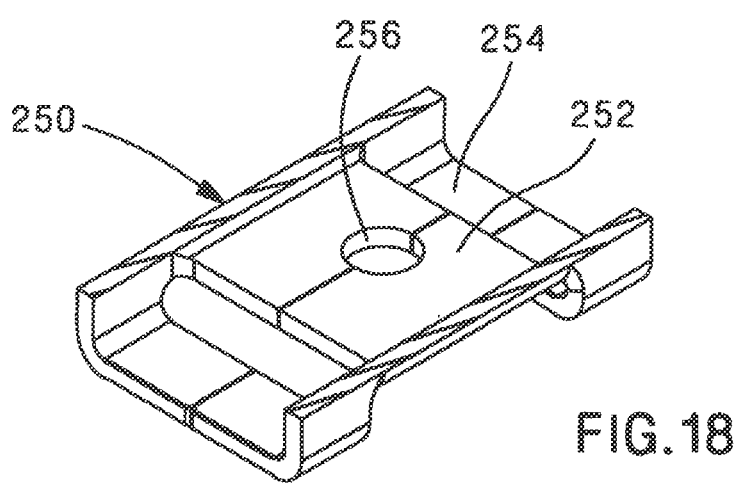
FIG. 18 is a cross-sectional view of the bi-level head of FIG. 17 taken along line 18-18.
Figure 19:
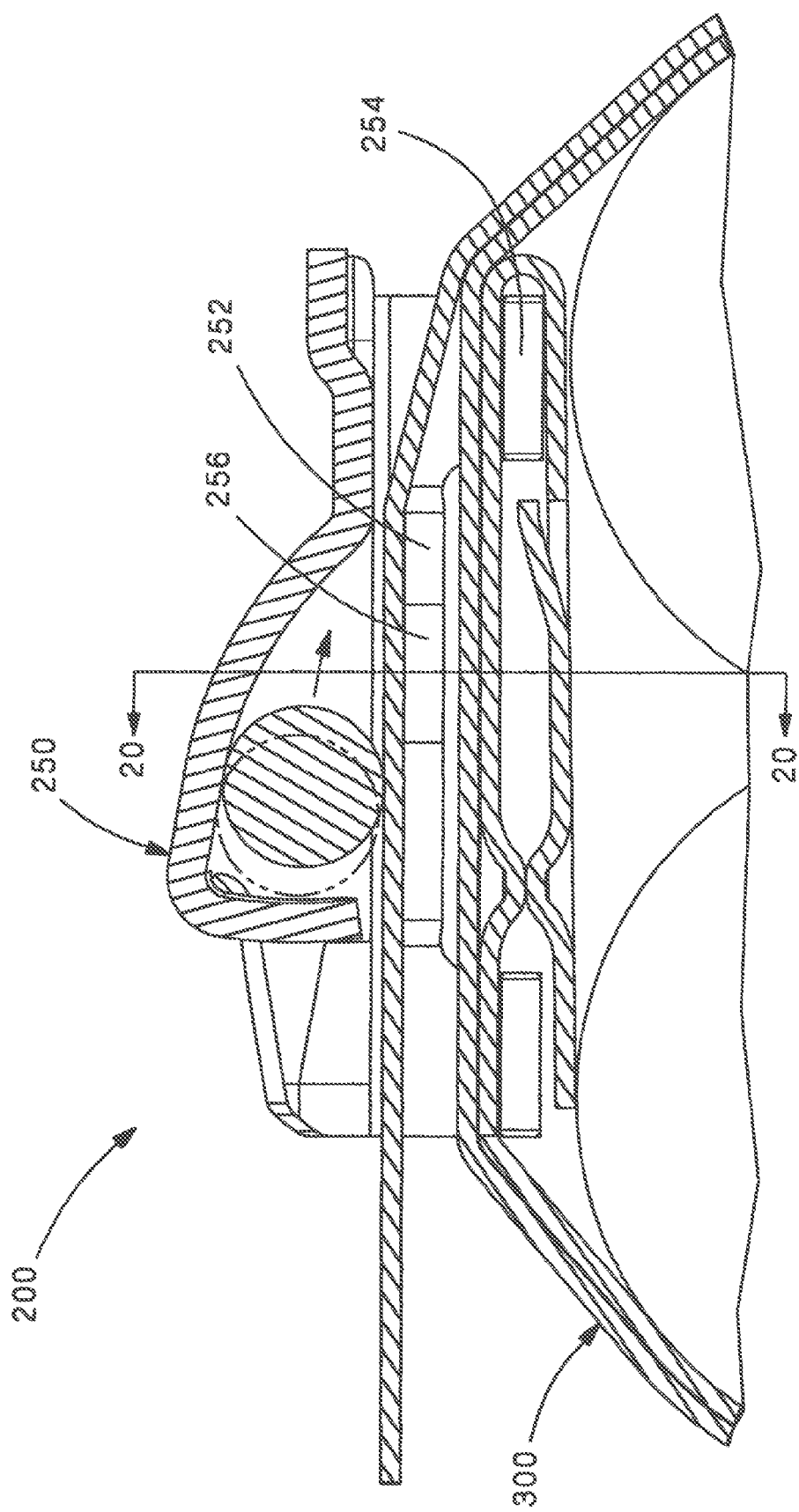
FIG. 19 is a sectional view of the alternative metal locking tie of FIG. 16 being installed around a bundle of cables with the locking ball approaching the locking displacement hole and the tie body extending along the primary head floor.
Figure 20:
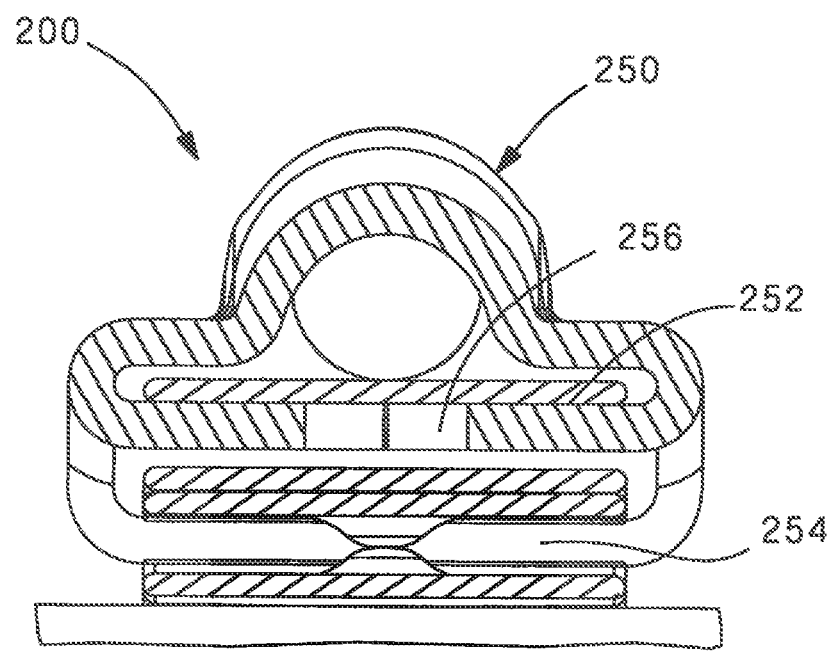
FIG. 20 is a cross-sectional view of the metal locking tie of FIG. 19 taken along line 20-20.

Alternatively, the bi-level head may be designed without the raised dimples. FIGS. 16-21 illustrate an alternative metal locking tie 200 with a bi-level head 250 and a tie body 300. The tie body 300 is identical to the tie body 150 described with respect to FIGS. 1-15. The bi-level head 250 includes a primary head floor 252 and a secondary, dual head floor 254. As illustrated in FIGS. 17-18, the primary head floor 252 only includes a locking displacement hole 256 located near the center of the primary head floor.

The bi-level head 250 of the alternative metal locking tie 200 separates loops of the tie body 300. As a result, the force required to insert the tie body 300 through the bi-level head 250 is minimized for each loop of the tie body 300. The bi-level head 250 also reduces the linear displacement of the tie body 300, provides a stronger metal locking tie 200 and reduces the variability in performance of the metal locking tie 200.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A metal locking tie comprising:
   a tie body having a first end and a second end;
   a head secured to the first end of the tie body, wherein the head has a roof, a bottom wall, a primary head floor and a secondary head floor; wherein the primary head floor includes a locking displacement hole;
   a locking ball positioned within the head; and
   wherein the head further having an entrance end, an exit end, a first passageway defined between the secondary head floor and a bottom of the primary head floor and a second passageway defined between a top of the primary head floor and the locking ball, wherein the first and second passageways extend from the entrance end to the exit end;
   whereby when the second end of the tie body is tensioned, the locking ball moves toward the locking displacement hole to secure the tie body in the head.

2. The metal locking tie of claim 1, wherein the locking ball is positioned on the primary head floor.

3. The metal locking tie of claim 1, wherein the secondary head floor is a dual head floor.

4. The metal locking tie of claim 1, wherein the primary head floor includes multiple contact points for securing the tie body; the tensioned tie body moves the locking ball toward the locking displacement hole forming a concave surface in the tie body.

5. A metal locking tie comprising:
a tie body having a first end and a second end;
a head secured to the first end of the tie body, wherein the head has a roof, a bottom wall, a primary head floor and a secondary head floor; wherein the primary head floor includes a locking displacement hole;
wherein the head further having raised dimples positioned on the primary floor of the head; and
a locking ball positioned within the head;
whereby when the second end of the tie body is tensioned, the locking ball moves toward the locking displacement hole to secure the tie body in the head.

6. A metal locking tie comprising:
a tie body having a first end and a second end;
a head secured to the first end of the tie body, wherein the head has a roof, a bottom wall, a primary head floor and a secondary head floor; wherein the primary head floor includes a locking displacement hole, the locking displacement hole is located at a center of the primary head floor, wherein the primary head floor further comprising a raised dimple positioned on each side of the locking displacement hole; and
a locking ball positioned within the head;
whereby when the second end of the tie body is tensioned, the locking ball moves toward the locking displacement hole to secure the tie body in the head.

7. A metal locking tie comprising:
a tie body having a first end and a second end;
a head secured to the first end of the tie body, wherein the head has a roof, a bottom wall, a primary head floor and a secondary head floor; wherein the primary head floor includes a locking displacement hole;
a locking ball positioned within the head;
wherein the tie body includes an upwardly extending deformation and a downwardly extending deformation, the upwardly extending deformation engages the downwardly extending deformation when the tie body is secured to the head;
whereby when the second end of the tie body is tensioned, the locking ball moves toward the locking displacement hole to secure the tie body in the head.

* * * * *

UNITED STATES PATENT AND TRADEMARK OFFICE
CERTIFICATE OF CORRECTION

| | | |
|---|---|---|
| PATENT NO. | : 8,635,745 B2 | Page 1 of 1 |
| APPLICATION NO. | : 12/952409 | |
| DATED | : January 28, 2014 | |
| INVENTOR(S) | : Earl J. DeBerry et al. | |

It is certified that error appears in the above-identified patent and that said Letters Patent is hereby corrected as shown below:

In the Specification

Column 2, line 18 which reads "…of FIG. 10 with the locking Fall positioned…" should read "…of FIG. 10 with the locking ball positioned…"

Column 2, line 41 which reads "…and a tie body 150, FIGS. 2 and 3 illustrate…" should read "…and a tie body 150. FIGS. 2 and 3 illustrate…"

Column 3, line 28 which reads "…installed in the bi-level head 1.00 and the bottom…" should read "…installed in the bi-level head 100 and the bottom…"

Column 3, lines 37-38 which reads "…at the entrance end 11.6 of the bi-level head…" should read "…at the entrance end 116 of the bi-level head…"

Column 3, line 50 which reads "…As the locking hall 128…" should read "…As the locking ball 128…"

Column 3, line 58 which reads "…locking hail 128…" should read "…locking ball 128…"

Column 4, line 8 which reads "…As a result, the three required to…" should read "…As a result, the force required to…"

Signed and Sealed this
Twenty-eighth Day of October, 2014

Michelle K. Lee
*Deputy Director of the United States Patent and Trademark Office*